April 13, 1926.
D. E. DE MÁRQUEZ
DRAFTING INSTRUMENT
Filed Nov. 9, 1923
1,580,419
2 Sheets-Sheet 2
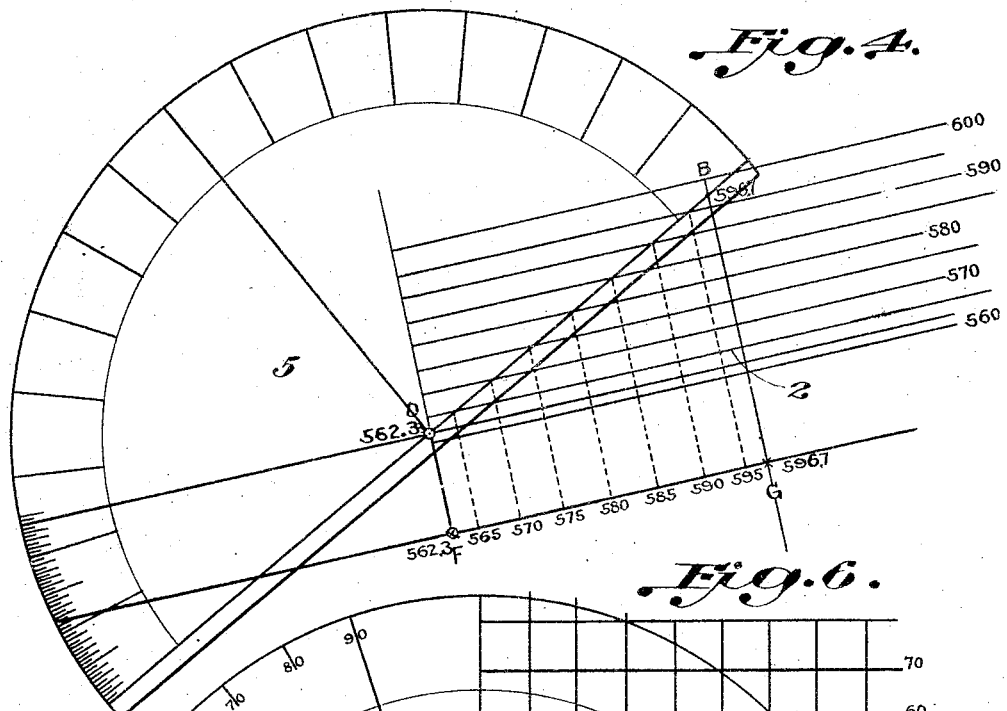
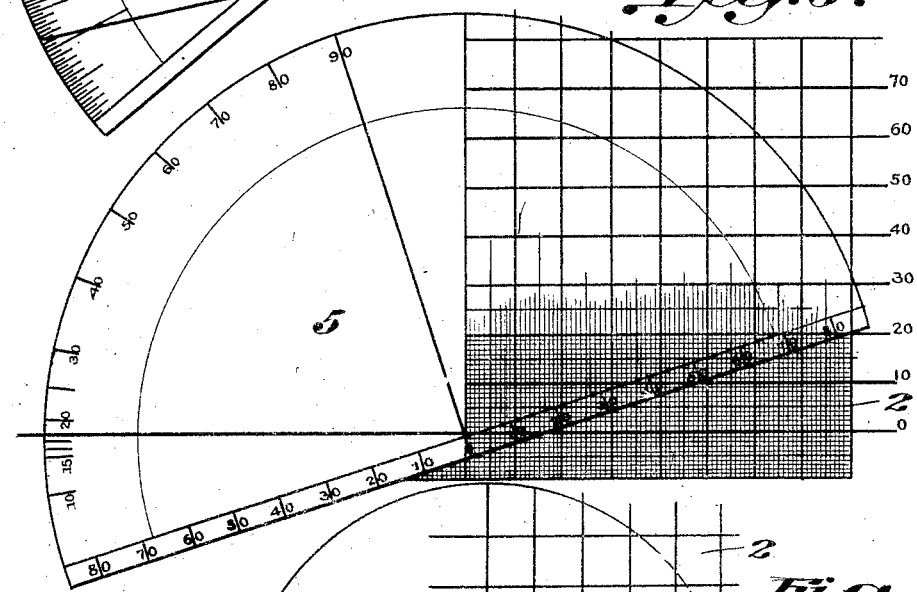
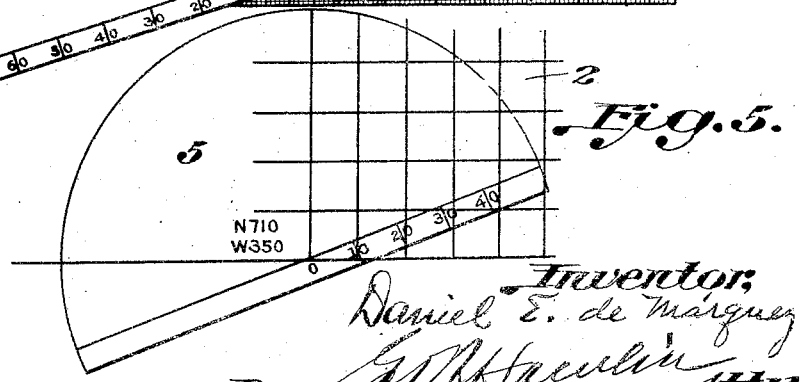
Inventor;
Daniel E. de Márquez
By [signature] Atty.

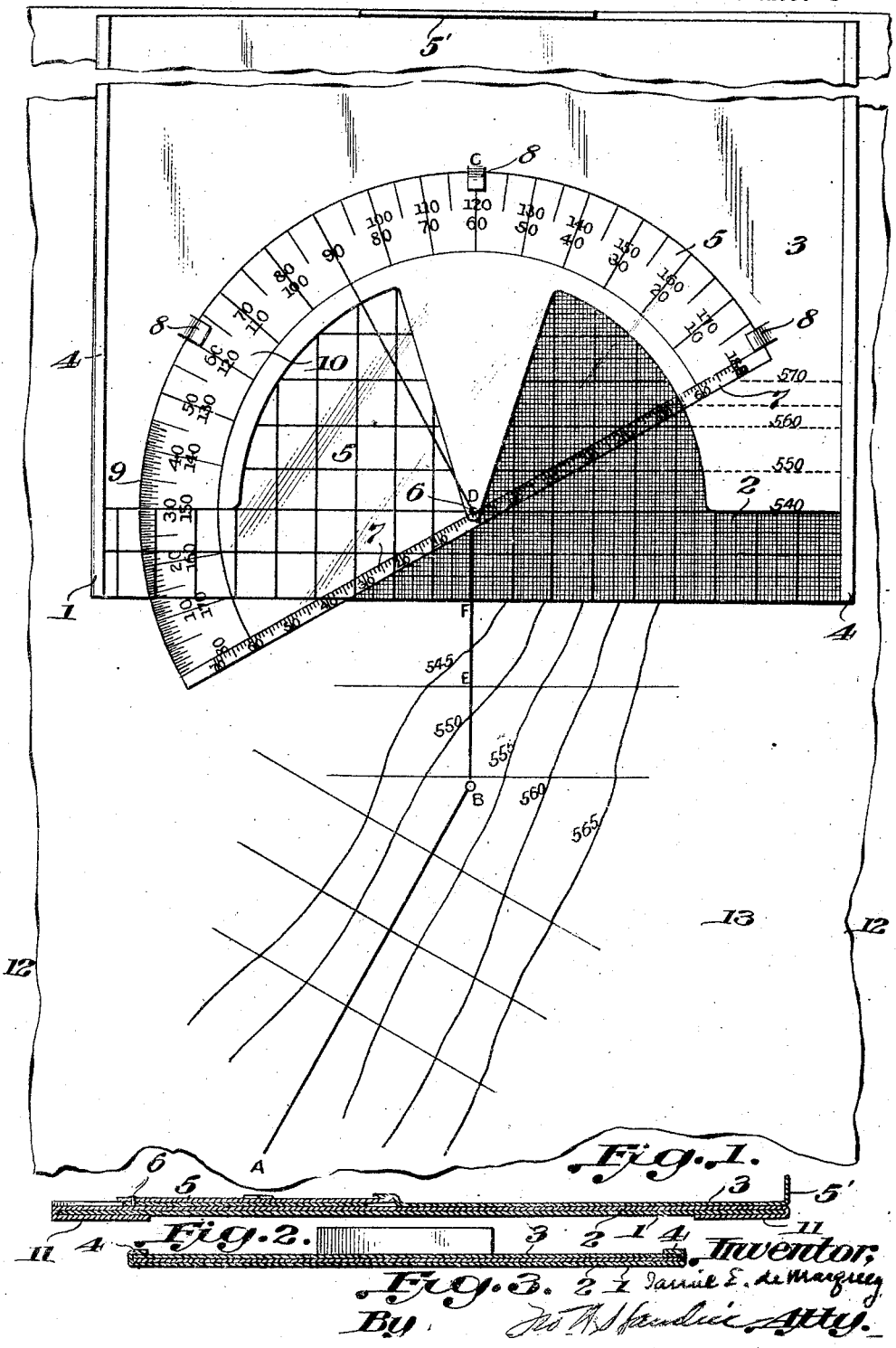

Patented Apr. 13, 1926.

1,580,419

UNITED STATES PATENT OFFICE.

DANIEL E. DE MÁRQUEZ, OF MEDELLIN, COLOMBIA.

DRAFTING INSTRUMENT.

Application filed November 9, 1923. Serial No. 673,836.

*To all whom it may concern:*

Be it known that I, DANIEL E. DE MÁRQUEZ, a citizen of the Republic of Colombia, residing at Medellin, Colombia, South America, have invented certain new and useful Improvements in Drafting Instruments, of which the following is a specification.

This invention relates to a novel drafting instrument adapted for use in plotting contours for topographic maps, calculating rectilinear surveys and, if desired, for use as a calculator in the solution of right angle triangles. Other uses may suggest themselves to mechanical and civil engineers, draftsmen, and others using an instrument of this character.

In the use of the instrument in plotting topographic surveys such as rights of way for railroads or public roads, and for other purposes, not only does it furnish means for laying out contour lines for points whose elevation has been established but, also, for interpolating contour elevations between such points.

The instrument also is adapted for the location of new coordinates in calculating latitudes and departures for a rectilinear survey. When used as a calculating device, given the angle and the length of the hypothenuse, the remaining functions may be solved.

The invention consists of a protractor pivotally or gyratorily mounted on a plate, board, or other member so as to be bodily movable therewith and yet capable of being turned to any desired position, combined with an under board or plate provided with a "graph" surface whose scale of cross section will vary to suit the requirements of the work to which the instrument is to be applied, the board or plate which mounts the protractor, being slidably or movably mounted in relation to the under plate or board having the graph surface.

A practical embodiment of the invention, such as hereinafter described and as shown in the accompanying drawings, employs graph paper of a scale of cross sectioning suitable to the requirements of the work, the paper being suitably held by, or attached to, the under board or plate.

While I believe my invention will find its greatest usefulness in the plotting of topographic surveys, nevertheless, as I am aware that it may be used as a calculator, it is to be noted that when used as a calculator, it is not essential that the protractor be mounted so that it may bodily traverse the graph surface of the under plate or board.

I am aware that the mechanical construction of the instrument may be varied without departing from the essential principles thereof; and, therefore, I do not limit the invention to the precise embodiment hereinafter described and which is shown in the accompanying drawings, in which:

Figure 1 is a plan view showing the complete instrument applied to an ordinary drafting board to which is secured a sheet of paper on which a topographic survey is being plotted by the use of the instrument, illustrating the progress of the map or drawing being made.

Fig. 2 is a longitudinal section through the instrument.

Fig. 3 is a cross section therethrough.

Fig. 4 is a plan view illustrating the use of the instrument in interpolating contour elevations between points whose elevation has been established by stadia observations.

Fig. 5 is a similar view illustrating the use of the instrument for calculating latitudes and departures for a rectilinear survey; and Fig. 6 is a similar view showing the use of the instrument in solving right triangles.

Referring first to Figs. 1, 2 and 3, the use of the instrument is shown in plotting contours from data secured in the field by an Abney level or the usual stadia transit. Fig. 1 illustrates the use of the instrument and the progress of the drafting of the map in work of this character such as the plotting of rights of way for railroads or public roads.

The instrument embodies a bottom board or plate 1, a cross section graph surface 2 provided thereon or carried thereby, a traversing plate or board 3 which has any suitable sliding connection or mounting 4 on the board or plate 1, and a protractor 5 of transparent material which is pivotally mounted on the traversing plate or board 3 at the point 6, said pivot 6 coinciding with the center of the protractor and with the zero point of the diameter scale 7 thereof.

The protractor 5 is guided for rotation by any suitable means 8 carried by the upper board or plate 3.

Any suitable finger piece 5' may be provided on the upper board or plate 3 to enable said board or plate, and the protractor 5 which is carried thereby, to be bodily moved to any desired point in relation to the cross section surface 2.

The protractor 5 is provided with degree or angle scales 9 and 10 reading in opposite directions so that positive and negative angles may be readily read off.

The diameter or base line scale 7 reads in opposite directions from the zero point represented by the graduation intersecting the pivot 6.

The cross section graph surface 2 is conveniently provided by the use of well known cross sectioned graph paper held to the bottom plate or board 1 in any suitable manner as, for instance, by introducing its edges between said plate and the upper plate or board 3 and by bending the ends of the paper against the back of the board or plate 1 as shown at 11, Fig. 2.

Referring to Figure 1, an ordinary drawing board is shown at 12 to which is suitably secured, as by thumb tacks, the drafting paper 13 on which the survey or map is to be plotted.

It will be noted that contours having previously been plotted on the drawing paper 13 by use of the present instrument along the line A, B, C, up to the cross section line E and that observations in the field at the cross section line F indicate a positive angle, to the right, of 30° at a distance of 50 feet from the base line B, C, with a uniform slope for the said 50 feet, the use of the instrument when continuing plotting of contours, proceeds in the manner now to be described. The elevation at point F along the line B, C, has been determined by field observations to be 540 feet. In the use of the instrument, under the conditions specified, the protractor 5 is set at an angle of 30° 0'. Observing the intersection of the protractor base line with the cross section or graph paper 2 beneath the protractor, it is found that at 50 feet the increased elevation amounts to 565 feet. The 5 foot contours can therefore be projected down to line F from the intersections of the 5 foot increments of height with the zero line of the protractor. These projected points can then be connected with the corresponding elevations along the line E and the contours established.

The advantage of mounting the protractor 5 in a slidable fashion as, by having it carried on the upper plate or board, is to allow the setting of the zero line of the protractor at any conceivable elevation such, for instance, as 543.5, and plotting the results as above noted without necessitating arithmetical observations.

From the foregoing description of the use of the instrument, it will be obvious that it is also useful in connection with interpolating contour elevations between points whose elevation has been established by stadia observations. Thus, in Fig. 4, there is illustrated how intermediate elevations may be plotted. From Fig. 4 it will be seen that if it is desired to plot 5 foot contours between the points F and G whose elevations are 562.3 and 596.7, respectively, this may be done as follows:

Set the zero mark of the protractor at the point representing the elevation 562.3 of the cross section graph surface 2; then place the lower edge of the bottom board or plate 1 in alinement with the line between the two points whose elevations are known, as shown at F—G. The protractor 5 is then rotated until the zero line passes through the intersection of 596.7 and a perpendicular from the point on the line F—G whose elevation is represented as 596.7. Next project to the edge of the bottom plate or board 1 the intersection of the zero line with the elevations on the graph surface 2 of 565, 570, 575, 580, 585, 590, and 595.

Referring to Fig. 5, illustration is given of the manner of use of the instrument for the calculation of the latitudes and departures for a rectilinear survey. Starting at known coordinates, placing the edge of the protractor 5 at the bearing on the line to the desired new point, and measuring the distance from the known point to the new point along the edge of the protractor, the new coordinate location can immediately be read on the cross section graph surface 2 under the protractor 5.

Figure 6 illustrates the use of the instrument as a calculating machine and the example indicated is a solution of a right angle triangle having an angle of 17° 30' and a hypothenuse of 40 feet. Having turned the protractor to indicate the angle of 17° 30', it is found that the 40 foot point of the scale 7 intersects the cross markings on the graph surface 2 at a point indicating a height of 12+ (actually 12.03) and that the downward projection from said point indicates a base of 38+ (actually 38.15). It is therefore apparent that given any two functions of the triangle, the remaining functions can be determined within the usual degree of accuracy.

I claim:

In an instrument of the character set forth, the combination with a cross-sectioned graph surface, of a traversing member mounted to be bodily movable across the cross-sectioned graph surface, and a protractor pivotally mounted on, and bodily carried by, said traversing member so that it is shifted bodily when said member is moved, said protractor having a base line scale denoting linear measure reading in opposite directions from zero at the pivotal point of the protractor, and being also provided with oppositely reading degree or angle scales whose respective zeros are at the respective ends of the base line scale aforesaid, said angle scales being used in connection with the aforesaid base line scale and the horizontal lines of the cross-sectioned graph surface to determine the degree or angle defined by the base line scale in relation to the horizontal lines of the graph surface.

In testimony whereof I affix my signature.

DANIEL E. DE MÁRQUEZ.